US012136800B2

(12) United States Patent
Takano et al.

(10) Patent No.: US 12,136,800 B2
(45) Date of Patent: Nov. 5, 2024

(54) GAS LEAKAGE DETECTION SYSTEM AND GAS LEAKAGE DETECTION METHOD

(71) Applicants: KABUSHIKI KAISHA TOSHIBA, Tokyo (JP); Toshiba Energy Systems & Solutions Corporation, Kawasaki (JP)

(72) Inventors: Kei Takano, Kawguchi Saitama (JP); Tooru Washiyama, Yokohama Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 366 days.

(21) Appl. No.: 17/622,218

(22) PCT Filed: Jul. 19, 2019

(86) PCT No.: PCT/JP2019/028444
§ 371 (c)(1),
(2) Date: Dec. 22, 2021

(87) PCT Pub. No.: WO2021/014490
PCT Pub. Date: Jan. 28, 2021

(65) Prior Publication Data
US 2022/0352697 A1 Nov. 3, 2022

(51) Int. Cl.
*H02B 13/065* (2006.01)
*G01F 23/16* (2006.01)
(Continued)

(52) U.S. Cl.
CPC ......... *H02B 13/065* (2013.01); *H02B 13/025* (2013.01); *G01F 23/16* (2013.01); *G01K 1/026* (2013.01); *H02B 13/055* (2013.01)

(58) Field of Classification Search
None
See application file for complete search history.

(56) References Cited

U.S. PATENT DOCUMENTS

| 5,889,467 A | 5/1999 | Marmonier et al. |
| 2001/0017262 A1 | 8/2001 | Nakashima et al. |
| (Continued) | | |

FOREIGN PATENT DOCUMENTS

| CN | 1199857 A | 11/1998 |
| CN | 1311434 A | 9/2001 |
| (Continued) | | |

OTHER PUBLICATIONS

International Search Report of International Applicaton No. PCT/JP2019/0284444 (2 pages).

*Primary Examiner* — Natalie Huls
*Assistant Examiner* — Nyla Gavia
(74) *Attorney, Agent, or Firm* — Finnegan, Henderson, Farabow, Garrett & Dunner, LLP

(57) ABSTRACT

A gas leakage detection system 1 with high detection accuracy for a remaining gas amount and a gas leakage amount of an insulation gas 28 in a container 27 forming a electrical apparatus 2 is provided. The gas leakage detection system 1 includes: the electrical apparatus 2 including: the container 27 to which a power distribution apparatus 29 is fixed and in which the insulation gas 28 is contained; a plurality of divided spaces 21 in the container 28 divided in parallel with a ground; a plurality of temperature sensors 22 which detects temperature of the insulation gas 28 and which is positioned in the plurality of the divided spaces 22; and a pressure sensor 23 which detects a pressure in the container 27; and a monitor 3 which calculates the remaining gas amount Mg of the insulation gas 28 remaining in the container 27 based on the temperature Ta and Tb of the insulation gas 28 detected by the plurality of the temperature (Continued)

sensors 22 and the pressure Pg of the insulation gas 28 detected by the pressure sensor 23.

9 Claims, 9 Drawing Sheets

(51) Int. Cl.
    *G01K 1/02*           (2021.01)
    *H02B 13/025*       (2006.01)
    *H02B 13/055*       (2006.01)

(56) References Cited

U.S. PATENT DOCUMENTS

| | | |
|---|---|---|
| 2011/0153232 A1 | 6/2011 | Ito |
| 2015/0194280 A1 | 7/2015 | Uchii et al. |
| 2015/0355049 A1 | 12/2015 | Ait Abdelmalek et al. |
| 2017/0030799 A1* | 2/2017 | Inami ............... H02B 13/0655 |
| 2018/0198141 A1* | 7/2018 | Gagliardo ......... H01M 8/04388 |

FOREIGN PATENT DOCUMENTS

| | | | |
|---|---|---|---|
| CN | 102104236 A | | 6/2011 |
| CN | 104956557 A | | 9/2015 |
| CN | 105932590 A | | 9/2016 |
| JP | H4-188807 A | | 7/1992 |
| JP | H7-241009 A | | 9/1995 |
| JP | 2000139009 A | * | 5/2000 |
| JP | 2000-266623 A | | 9/2000 |
| JP | 2002-17010 A | | 1/2002 |
| JP | 2007263584 A | * | 10/2007 |
| JP | 2011-77385 A | | 4/2011 |
| JP | 2011077385 A | * | 4/2011 |
| JP | 2016-57135 A | | 4/2016 |
| JP | 2017-26559 A | | 2/2017 |

\* cited by examiner

GAS LEAKAGE DETECTION SYSTEM AND GAS LEAKAGE DETECTION METHOD

CROSS-REFERENCE TO RELATED APPLICATIONS

This Application is the National Stage of International Application No. PCT/JP2019/028444, filed Jul. 19, 2019, and published on Jan. 28, 2021, as WO 2021/014490 A1, the contents of which are incorporated herein by reference in their entireties.

FIELD

The present disclosure relates to a gas leakage detection system and a gas leakage detection method to detect gas leakage amount of insulation gas contained in containers of electrical apparatuses.

BACKGROUND

Stationary induction electrical apparatus such as transformers and reactors may be fixed in containers in which insulation gas such as $SF_6$ Gas is contained to form electrical equipment. Such equipment is called "gas insulation stationary induction electrical apparatus". The insulation gas such as $SF_6$ gas contained in the container is used to ensure insulation of the stationary induction electrical apparatus and to cool the stationary induction electrical apparatus. If the insulation gas leaks and pressure of the insulation as decreases, insulation performance and cooling capability of the electrical apparatus deceases, resulting in deterioration of internal components by dielectric breakdown and overheating may occur, which is not preferable.

In addition, since the insulation gas mainly consists of global warming gas with high global warming potential, such as $SF_6$ gas, it is not desirable that said gas is released into atmosphere. Therefore, it is very important to grasp a leakage amount of the insulation gas such as $SF_6$ gas. Gas leakage detection systems to grasp the leakage amount of the insulation gas is known.

PRIOR ART DOCUMENT

Patent Document

Patent Document 1: Japanese Laid-Open Application JP2000-139009
Patent Document 2: Japanese Laid-Open Application. JP2016-057135
Patent Document 1: Japanese Laid-Open Application JP2017-026559

SUMMARY OF INVENTION

Problems to be Solved by Invention

As described above, it is very important to grasp the leakage amount of the insulation gas such as $SF_6$ gas contained in the container of the electrical apparatuses. For example, electrical apparatuses such as gas in stationary induction electrical apparatuses include therein heating elements which are formed by windings and which generate large amount of heat. In addition, the electrical apparatus has gas floor to circulate the insulation gas, and the insulation gas may forcibly be circulated in the container forming the electrical apparatus.

Accordingly, the temperature distribution of the insulation gas in the container forming the electrical apparatus is not uniform. As a result, the density of molecules of the insulation gas is not uniform in the container forming the electrical apparatus. Conventional gas leakage detection systems have a problem that the detection accuracy for the leakage amount is low due to the non-uniform density of the molecules of the insulation gas in the container forming the electrical apparatus.

The objective of the present embodiment is to provide a gas leakage detection system and a has leakage detection method with high detection accuracy for the leakage amount of the leakage amount of the insulation gas in the container forming the electrical apparatus.

Means to Solve the Problem

A gas leakage detection system of the present embodiment has the following configuration.
(1) An electrical apparatus including:
  (1-1) a container to which a power transmission and distribution apparatus is fixed and in which an insulation gas is contained;
  (1-2) a plurality of divided spaces in the container divided in parallel with a ground;
  (1-3) a plurality of temperature sensors which detects temperature of the insulation gas and which is positioned in the plurality of the divided spaces;
  (1-4) a pressure sensor which detects a pressure in the container.
(2) a monitor which:
  (2-1) calculates a remaining gas amount of the insulation gas remaining in the container based on the temperature of the insulation gas detected by the plurality of the temperature sensors and the pressure of the insulation gas detected by the pressure sensor.

In addition, a gas leakage detection method including the above features is also an aspect of the present disclosure.

EMBODIMENTS

Figure 1:
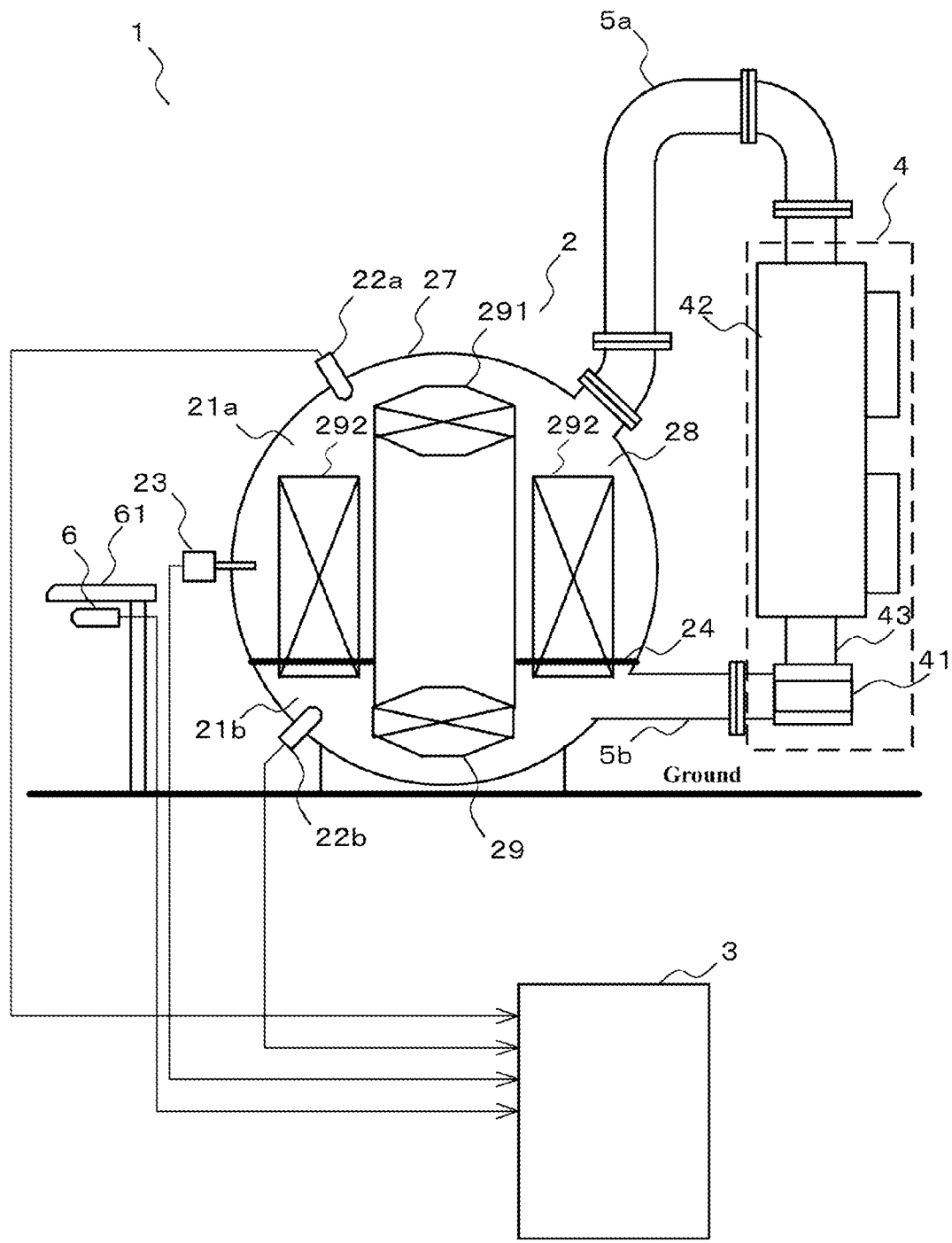
FIG. 1 is diagram illustrating a configuration of a gas leakage detection system according to a first embodiment.

In the present embodiment, same devices, portions, and signals are labeled and described with the same signs, and when each of the devices, portions, and signals are to be described individually, they will be distinguished by additional letters.

The following signals, data, and information are input to, output from, and are stored in a gas leakage detection system 1. A volume of 1 mol of an insulation gas 28 is called a molar volume [l/mol]. In addition, moles of the insulation gas are called a physical quantity [mol].

Ta[K]: temperature of the insulation gas in a divided space 21a

Tb[K]: temperature of the insulation gas 28 in the divided space 21b

Tc[K]: temperature of the insulation gas 28 in a cooling portion 42

Tg[K]: average temperature of the insulation gas 28 in a container 27

Tu[K]: outside temperature

Pg[Pa]: pressure of the insulation gas 28 in the container 27

Va[l/mol]: molar volume of the insulation gas 28 in the divided space 21a

Vb[l/mol]: molar volume of the insulation gas 28 in the divided space 21b

Vc[l/mol]: molar volume of the insulation gas 28 in the cooling portion 42

Vg[l/mol]: molar volume of the insulation gas 28 in a container 27

Ma[mol]: physical quantity of the insulation gas 28 in the divided space 21a (amount of remaining gas)

Mb[mol]: physical quantity of the insulation gas 28 in the divided space 21b (amount of remaining gas)

Mc[mol]: physical quantity of the insulation gas 28 in the cooling portion 42 (amount of remaining gas)

Mt[mol]: total physical quantity of the insulation gas 28 in the container 27 and the cooling portion 42 (total amount of remaining gas)

Ml[mol]: physical quantity of leaked insulation gas 28 (gas leakage amount)

Mo[mol]: Physical quantity of the insulation gas when there is no leakage

Ua[l]: volume of the divided space 21a

Ub[l]: volume of the divided space 21b

Uc[l]: volume of the cooling portion 42

Ug[l]: volume of the container 27

Ms[mol]: reference value that is an upper limit for the leakage amount of the insulation gas 28

Ts[K]: limit value for change in the outside temperature in a unit time

A, B: function of molar volume V [l/mol] used for calculating the remaining leakage gas of the insulation gas 28

C, D: weighting factor

The physical quantity Ma [mol] and Mb [mol] correspond to

In below, to describe the positional relationship and direction of each portion, a ground direction where an electrical apparatus 2 is arranged in a gas leakage detection system 1 is referred to as a ground side, and the side opposite is referred to as a sky side.

First Embodiment

[1-1. Configuration]

(Entire Structure of Gas Leakage Detection System 1)

Figure 2:
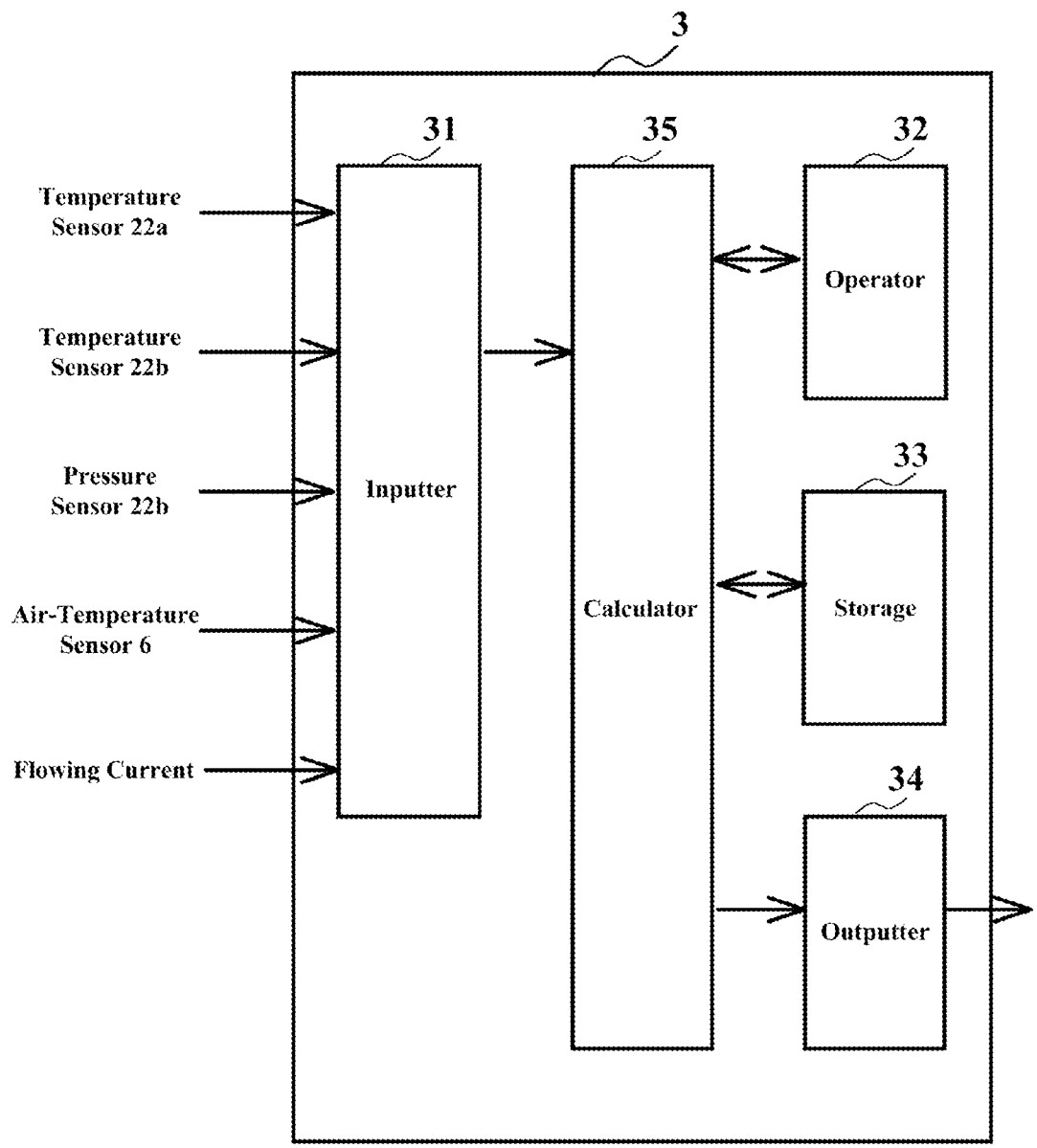
FIG. 2 is a diagram illustrating a configuration of a monitor of the gas leakage detection system according to a first embodiment.

In below, a configuration of the gas leakage detection system 1 of the present embodiment is described with the reference to FIGS. 1 and 2. The gas leakage detection system 1 is installed, for example, in substations.

As one example, the gas leakage detection system 1 of the present embodiment in which the electrical apparatus 2 is configured by a transformer 29 is described. The transformer 29 corresponds to an apparatus for power distribution in the claims. The gas leakage detection system 1 includes the electrical apparatus 2, a monitor 3, a circulator 4, a piping 5, and an air-temperature sensor 6.

(Electrical Apparatus 2)

The electrical apparatus 2 includes divided spaces 21 (21a and 21b), temperature sensors 22 (22a and 22b), a pressure sensor 23, a partition plate 24, a container 27, and the transformer 29. The insulation gas is contained and sealed in the container 27. The electrical apparatus 2 is installed in, for example, substations indoor and outdoor.

The transformer 29 is configured by a voltage conversion device having an iron core 291 and a winding 292. The iron core 291 is fixed to the container 27 so that the transformer 29 is fixed to the container 27. The transformer 29 is arranged in the insulation gas 28 contained in the container 27. The transformer 29 is connected to a power supply line (not illustrated) and transforms voltage of the supplied power.

The container 27 is a metal cylindrical sealed container connected to, for example, the power supply lines, and the insulation gas 28 is contained therein. Insulative gas such as $SF_6$ gas is used as the insulation gas 28. The transformer 29 is arranged in the container 27.

The partition plate 24 is arranged in the container 27. The partition plate 24 attached to the transformer 29 is inserted into the container 27, fixed to the container 27 by insulative bolts, etc., and horizontally divides a space in the container 27 into two spaces except for where the transformer 29 exists, so that the insulation gas 28 circulates around the iron core 291 and the winding 292 to achieve cooling effect.

The partition plate 24 divides an interior of the container 27 in the direction parallel with the ground plane to form two divide spaces 21a and 21b. The divided space 21a is a semi-cylindrical space provided at the sky side in the container 27. The divided space 21b is a semi-cylindrical space provided at the ground side in the container 27. The divided spaces 21a and 21b are ventilated through a cooling gas flow path provided in the iron core 291 and the winding 292.

Temperature sensors 22a and 22b are provided in the divided spaces 21a and 21b, respectively. The temperature sensors 22a and 22b are sensors, such as resistance temperature resistor, for measuring temperature. The temperature sensor 22a is provide on an inner wall of the container 27 forming the divided space 21a. The temperature sensor 22a is arranged at the sky side than the partition plate 24. It is desirable that the temperature sensor 22a is arranged at a position at the sky side than the winding 292 of the transformer 29, as far as possible from the ground, and where the temperature sensor 22a does not contact the iron core 192, the winding 292, and components in the container 27.

The temperature sensor 22b is provide on an inner wall of the container 27 forming the divided space 21b. The temperature sensor 22b is arranged at the ground side than the partition plate 24. It is desirable that the temperature sensor 22*b* is arranged at a position at the ground side than the winding 292 of the transformer 29, as close as possible to the ground, and where the temperature sensor 22*b* does not contact the iron core 192, the winding 292, and components in the container 27.

The temperature sensor 22*a* detects a temperature Ta [K] of the insulation gas 28 at the upper side of the divided space 21*a* and outputs the temperature Ta to the monitor 3. The temperature sensor 22*b* detects a temperature Tb [K] of the insulation Gas 28 in the divided space 21*b* and outputs the temperature Tb to the monitor 3.

The pressure sensor 23 is provided in the container 27. The pressure sensor 23 is a sensor for measuring pressure configured by semiconductor elements such as piezoelectric elements. The pressure sensor 23 is arranged on the inner wall of the container 27 near the boundary between the divided spaces 21*a* and 21*b*. The pressure sensor 23 detects a pressure Pg [Pa] of the insulation gas 28 in the container 27 and outputs the pressure Pg to the monitor 3. The pressure sensor 23 may be arranged at any location in the container 27.

(Circulator 4)

The circulator 4 an apparatus to circulate and cool the insulative gas 28 in the container 27. The circulator 4 includes a Gas blower 41 and a cooler 42. The gas blower 41 and the cooler 42 is connected via a piping 43. The gas blower 41 of the circulator 4 is connected to the divided space 21*b* of the container 27 via a piping 5*b*. The cooler 42 of the circulator 4 is connected to the divided space 21*a* of the container 27 via a piping 5*a*.

The gas blower 41 is configured by a suction apparatus to suck the insulation gas 28 in the container 27. The gas blower 41 sucks the insulation gas 28 in the divided space 21*a* in the container 27 and sends the sucked insulation gas 28 to the cooler 42. The cooler 42 is configured by, for example, radiators. The cooler cools the insulation gas 28 sucked by the gas blower 41 and sends the cooled insulation gas 28 to the divided space 21*b* in the container 27. The partition plate 24 in the container 27 horizontally divides the space in the container 27 into two spaces except for where the transformer 29 exists, so that the insulation gas 28 circulates around the iron core 291 and the winding 292 to achieve cooling effect. The insulation gas 28 is circulated in an order from the divided space 21*a*, the cooler 42, the gas blower 41, and the divided space 21*b*.

(Air-Temperature Sensor 6)

The air-temperature sensor 6 is a sensor, such as resistance temperature resistor, for measuring temperature. The air-temperature sensor 6 is installed near the electrical apparatus 2, and when the circulator is installed outdoor, the air-temperature sensor 6 is installed at where the direct sunlight is blocked by sunshades 61. The air-temperature sensor 6 detects an outside temperature Tu [K] and outputs the outside temperature Tu to the monitor 3.

(Monitor 3)

The monitor 3 is configured by, for example, personal computers. The monitor 3 is arranged in a control board installed near the container 27 or in control rooms in the substations to monitor and control electrical power. The monitor 3 receives the temperature Ta [K] of the insulation gas 28 in the divided space 21*a* from the temperature sensor 22*a* of the electrical apparatus 2 and the temperature Tb [K] of the insulation gas 28 in the divided space 21*b* from the temperature sensor 22*b* of the electrical apparatus 2. The monitor 3 receives the pressure Pg [Pa] of the insulation gas 28 in the container 27 from the pressure sensor 23 of the electrical apparatus 2. The monitor 3 receives the outside temperature Tu [K] from the air-temperature sensor 6. The monitor 3 receives the flowing current values of the transformer 29 from unillustrated sensors installed in the power supply lines, such as CTs, etc.

The monitor 3 calculates the physical quantity Mg [mol] of the insulation gas in the container 27. The monitor 3 calculates the physical quantity Ml [mol] of the leaked insulation gas based on the calculated physical quantity Mg [mol] remaining in the container 27, and when the physical quantity Ml [mol] is equal to or more than the reference value Ms [mol] that is the predetermined upper limit for the leakage amount of the insulation gas 28, an alert is output. When the change in the outside temperature Tu [K] detected by the air-temperature sensor 6 becomes equal to or more than the limit value Ts [K] for a change in the outside temperature in a unit time, or when a change in the flowing current of the transformer 29 becomes equal to or more than the limit value for a change in the current in a unit time, the monitor 3 stops the calculation of the physical quantity Mg [mol] of the insulation gas the container 27.

The monitor 3 includes an inputter 31, an operator 32, a storage 33, an outputter 34, and a calculator 35.

The inputter 31 is configured by an analog-digital conversion circuit. The electrical apparatus 2 and the air-temperature sensor 6 are connected to an input side of the inputter 31, and the calculator 35 is connected to an output side of the inputter 31. Following information is input to the inputter 31.

Ta[K]: temperature of the insulation gas in a divided space 21*a*

Tb[K]: temperature of the insulation gas 28 in the divided space 21*b*

Tu[K]: outside temperature

Pg[Pa]: pressure of the insulation gas 28 in the container 27

The temperature Ta [K] is transmitted from the temperature sensor 22*a*, the temperature Tb [K] is transmitted from the temperature sensor 22*b*, and the pressure Pg [Pa] is transmitted from the pressure sensor 23. The outside temperature Tu [K] is transmitted from the air-temperature sensor 6.

The inputter 31 analog-digital converts the temperature Ta [K] of the insulation gas 28 in a divided space 21*a*, the temperature Tb [K] of the insulation gas 28 in a divided space 21*b*, the pressure Pg [Pa] of the insulation gas 28 in the container 27, and the outside temperature Tu [K], and output them to the calculator 35.

The operator 32 is configured by input devices such as keyboards. The operator 32 is connected to the calculator 35. The following information is input from the operator 32.

Ms[mol]: reference value that is an upper limit for the leakage amount of the insulation gas 28

Ts[K]: limit value for change in the outside temperature in a unit time

C, D: weighting factor

The storage 33 is configured by storage media such as semiconductor memories and hard disks. A readout from the storage 33 is controlled by the calculator 35. The storage 33 stores the following information.

Ms[mol]: reference value that is an upper limit for the leakage amount of the insulation gas 28

Ts[K]: limit value for change in the outside temperature in a unit time

C, D: weighting factor

Ua[l]: volume of the divided space 21*a*

Ub[l]: volume of the divided space 21*b*

Ug[l]: volume of the container 27

Uc[l]: volume of the cooling portion 42

Mo[mol]: Physical quantity of the insulation gas when there is no leakage

The outputter 34 is configured by, for example, display devices, printers, and communication interfaces. When the physical quantity Ml [mol] of the leaked insulation gas 28 is equal to or more than the reference value that is the predetermined upper limit for the leakage amount of the insulation gas 28, the outputter 34 outputs an alert by displaying, printing, or communication telegram. The outputter 34 outputs the physical quantity Mg [mol] of the insulation gas 28 remaining in the container 27 by displaying, printing, or communication telegram.

The calculator 35 is configured by microcomputers. The calculator 35 stores therein computer programs described later. The calculator 35 is connected to the inputter 31, the operator 32, the storage 33, and the outputter 34. The calculator 35 performs the following calculation and control.

(A) Controlling the Inputter 31

The calculator 35 controls the inputter 31 to receive the following data.

Ta[K]: temperature of the insulation gas in a divided space 21*a*

Tb[K]: temperature of the insulation gas 28 in the divided space 21*b*

Tu[K]: outside temperature

Pg[Pa]: pressure of the insulation gas 28 in the container 27

(B) Controlling the Operator 32

The calculator 35 controls the operator 32 to receive the following data.

Ms[mol]: reference value that is an upper limit for the leakage amount of the insulation gas 28

Ts[K]: limit value for change in the outside temperature in a unit time

C, D: weighting factor (C) Controlling the Storage 33

The calculator 35 stores the following data in the storage 33 and reads out the following data from the storage 33.

Ms[mol]: reference value that is an upper limit for the leakage amount of the insulation gas 28

Ts[K]: limit value for change in the outside temperature in a unit time

C, D: weighting factor

The calculator 35 reads out the following preset data from the storage 33.

Ua[l]: volume of the divided space 21*a*

Ub[l]: volume of the divided space 21*b*

Ug[l]: volume of the container 27

Uc[l]: volume of the cooling portion 42

Mo[mol]: Physical quantity of the insulation gas when there is no leakage (D) Controlling the Outputter 34

When the physical quantity Ml [mol] of the leaked insulation gas 28 is equal to or more than the reference value that is the predetermined upper limit for the leakage amount of the insulation gas 28, the calculator 35 controls the outputter 34 to output an alert by displaying, printing, or communion telegram. the calculator 35 controls the outputter 34 to output the physical quantity Mg [mol] of the insulation gas 28 remaining in the container 27 and the physical quantity Ml [mol] of the leaked insulation gas 28 by displaying, printing, or communication telegram.

(E) Calculation

The calculator 35 calculates the following.

Va[l/mol]: molar volume of the insulation gas 28 in the divided space 21*a*

Vb[l/mol]: molar volume of the insulation gas 28 in the divided space 21*b*

Vg[l/mol]: molar volume of the insulation gas 28 in a container 27

Vc[l/mol]: molar volume of the insulation gas 28 in the cooling portion 42

Ma[mol]: physical quantity of the insulation gas 28 in the divided space 21*a* (amount of remaining gas)

Mb[mol]: physical quantity of the insulation gas 28 in the divided space 21*b* (amount of remaining gas)

Mc[mol]: physical quantity of the insulation gas 28 in the cooling portion 42 (amount of remaining gas)

Mg[mol]: physical quantity of the insulation gas 28 in the container 27

Ml[mol]: physical quantity of leaked insulation gas 28 (gas leakage amount)

Thus, the configuration of the gas leakage detection system 1 is described.

[1-2. Action]

Next, actions of the gas leakage detection system 1 is described based on FIGS. 1 to 6.

The monitor 3 of the gas leakage detection system 1 calculates the physical quantity Mg [mol] of the insulation gas 28 in the container 27. In addition, the monitor 3 calculates the physical quantity Mc [mol] of the insulation gas 28 in the cooler 42. The monitor 3 calculates the physical quantity Ml [mol] of the leaked insulation gas 28 based on the physical quantity Mg [mol] of the insulation gas 28 in the container 27 and the physical quantity Mc [mol] of the insulation gas 28 in the cooler 42. When the physical quantity Ml [mol] is equal to or more than the reference value Ms [mol] that is the predetermined upper limit for the leakage amount of the insulation gas 28, an alert is output. Units of the physical quantities Mg, Mc, and Ml may be converted from [mol] to [kg] as appropriate.

Figure 3:
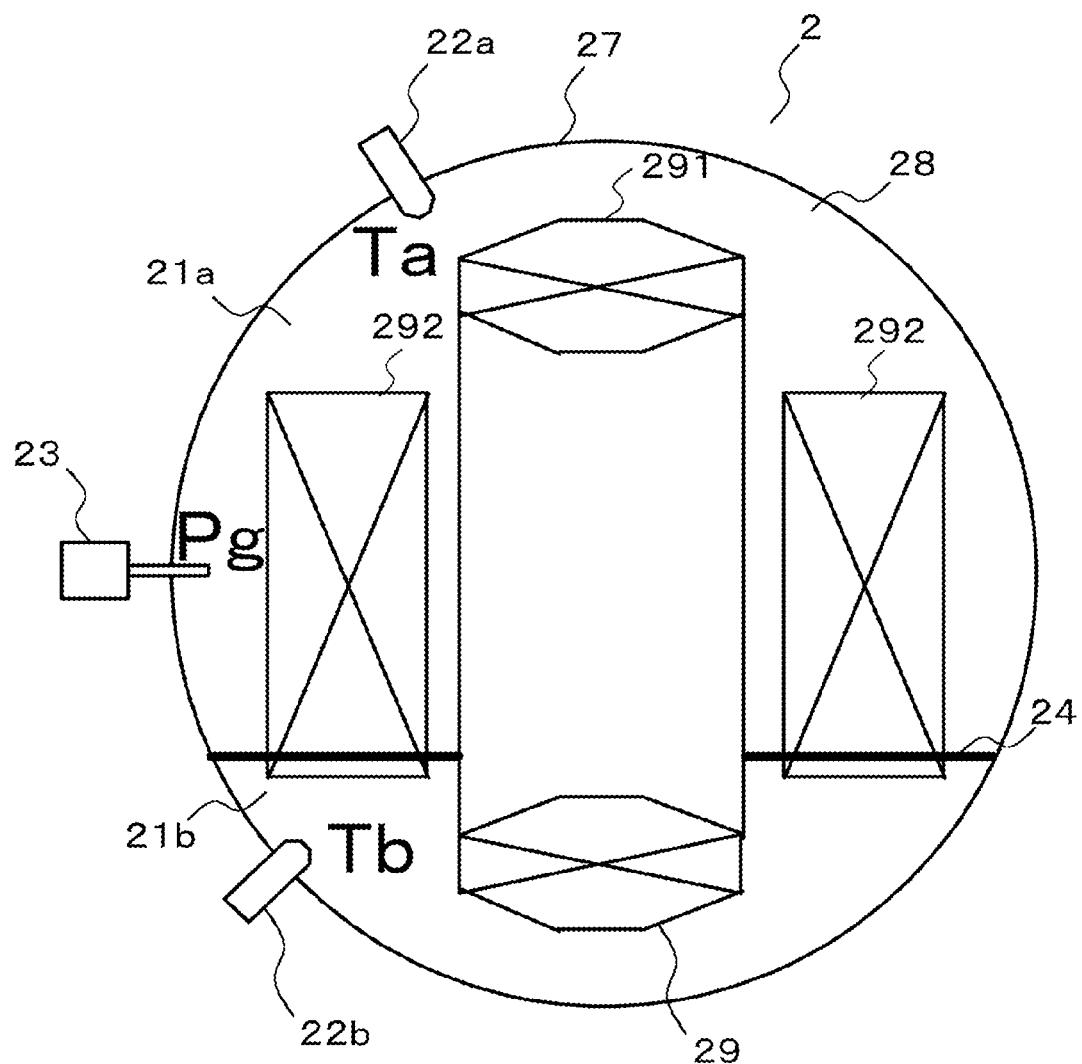
FIG. 3 is a diagram describing a calculation of a remaining amount of an insulation gas in a container of the gas leakage detection system according to the first embodiment.

As illustrated in FIG. 3, the temperature Ta [K] of the insulation gas 28 in the divided space 21*a* is detected by the temperature sensor 22*a*, the temperature Tb [K] of the insulation gas 28 in the divided space 21*b* is detected by the temperature sensor 22*b*, and the pressure Pg [Pa] of the insulation gas 28 in the container 27 is detected by the pressure sensor 23. Furthermore, the outside temperature Tu [K] is detected by the air-temperature sensor 6. The temperature Ta [K], the temperature Tb [K], the pressure Pg [Pa], and the outside temperature Tu [K] are input to the inputter 31 of the monitor 3, are analog-digital converted, and are transmitted to the calculator 35.

[Calculation of Physical Quantity Mg [mol] of Insulation Gas 28 in Container 27]

Figure 6:
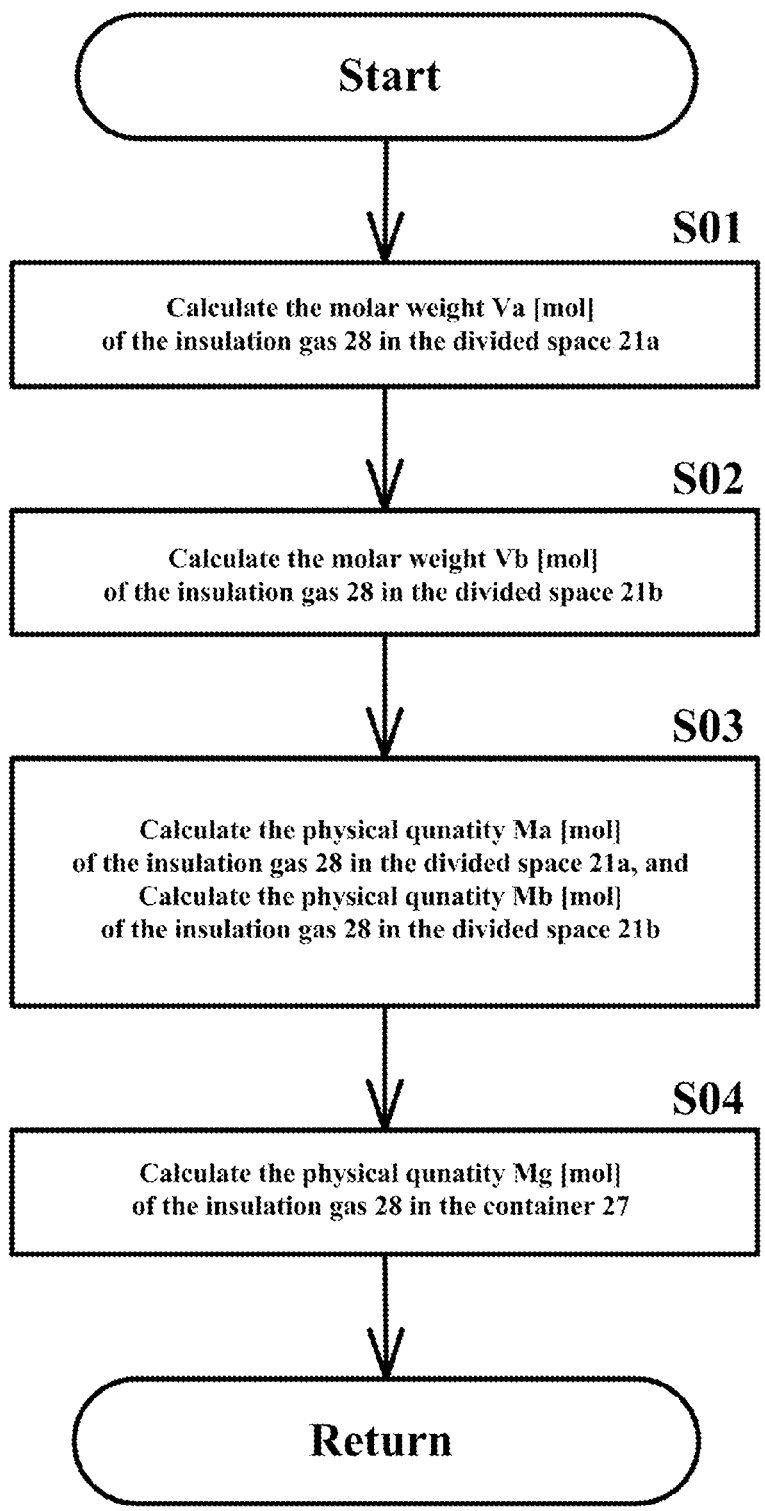
FIG. 6 is a program flow to calculate a physical quantity of the insulation gas in the container of the gas leakage detection system according to the first embodiment.

Firstly, the calculation scheme of the physical quantity Mg [mol] of the insulation gas 28 in the container 27 is described. The calculated physical quantity Mg [mol] of the insulation gas 28 in the container 27 is an amount of insulation gas 28 remaining in the container 27. The calculator 35 calculates the physical quantity Mg [mol] based on a program flow illustrated in FIG. 6. The program illustrated in FIG. 6 is periodically executed at constant intervals.

(Step S01: Calculation of Molar Weight Va [l/mol] of Insulation Gas 28 in Divided Space 21*a*)

The calculator 35 calculates the molar weight Va [l/mol] of the insulation gas 28 in the divided space 21*a* by Formula 1.

$$Pg = [R \cdot Ta(Va+B) - A]/Va^2 \qquad \text{(Formula 1)}$$

A and B are coefficients defined according to types of the insulation gas 28 contained in the container 27 and are primary functions for the molar weight Va [l/mol] of the insulation gas 28. As one example, when the insulation gas 28 is $SF_6$ gas, A and B are expressed by the following formula.

$$A=15.78(1-0.1062Va) \quad \text{(Formula 1A)}$$

$$B=0.366(1-0.1236Va) \quad \text{(Formula 1B)}$$

(Step S02: Calculation of Molar Weight Vb [l/mol] of Insulation Gas 28 in Divided Space 21b)

The calculator 35 calculates the molar weight Vb [l/mol] of the insulation gas 28 in the divided space 21b by Formula 2.

$$Pg=[R \cdot Tb(Vb+B)-A]/Vb^2 \quad \text{(Formula 2)}$$

A and B are coefficients defined according to types of the insulation gas 28 contained in the container 27 and are primary functions for the molar weight Vb [l/mol] of the insulation gas 28. A and B are expressed by the formulae as same as the Formula 1A and 1B, respectively.

(Step S03: Calculation of Physical Quantity Ma [mol] of Insulation Gas 28 in Divided Space 21a and Physical Quantity Mb [mol] of Insulation Gas 28 in Divided Space 21b)

Next, the calculator 35 calculates the physical quantity Ma [mol] of the insulation gas 28 in the divided space 21a and the physical quantity Mb [mol] of the insulation gas 28 in the divided space 21b by Formula 3.

$$Ma=Ua/Va \quad Mb=Ub/Vb \quad \text{(Formula 3)}$$

Ua is a volume [l] of the divided space 21a, Ub is a volume [l] of the divided space 21b, and Ua and Ub are set and stored in the storage 33 in advance.

(Step S04: Calculation of Physical Quantity Mg [mol] of Insulation Gas 28 in Container 27)

Next, the calculator 35 calculates the physical quantity Mg [mol] of the insulation gas 28 in the container 27 by Formula 4.

$$Mg=Ma+Mv \quad \text{(Formula 4)}$$

By the above scheme, the physical quantity Mg [mol] of the insulation gas 28 in the container 27 that is the amount of insulation gas 28 remaining in the container 27 is calculated.

[Calculation of Physical Quantity Mc [mol] of Insulation Gas 28 in Cooler 42]

Figure 7:
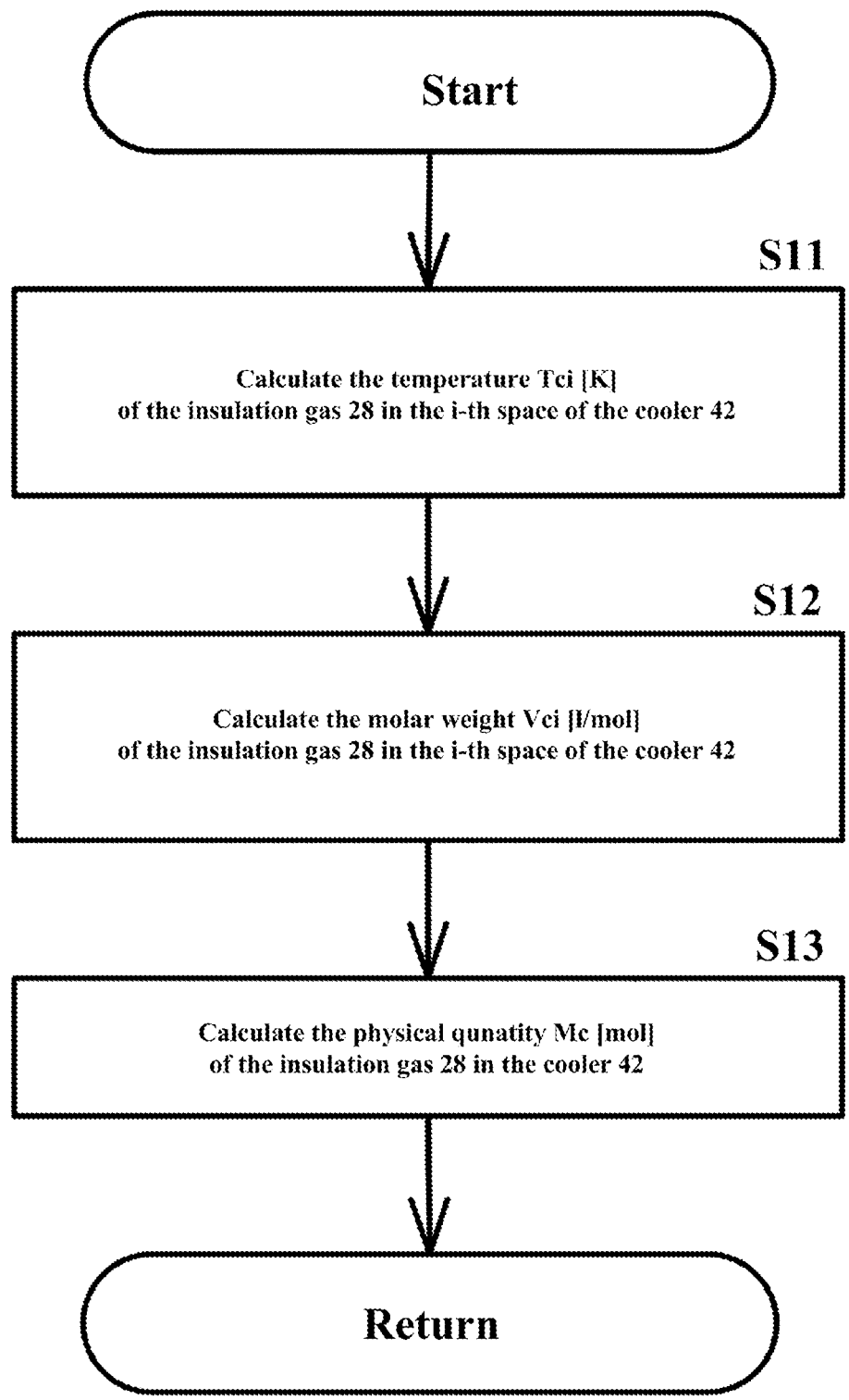
FIG. 7 is a program flow to calculate a physical quantity of the insulation gas in the cooler of the gas leakage detection system according to the first embodiment.

Next, the calculation scheme for the physical quantity Mc [mol] of the insulation gas 28 in the cooler 42 is described. The calculated physical quantity Mc [mol] of the insulation gas 28 in the cooler 42 is the amount of insulation gas 28 remaining in the cooler 42. The calculator 35 calculates the physical quantity Mc [mol] based on a program flow illustrated in FIG. 7. A program illustrated in FIG. 7 is periodically executed at constant intervals.

(Step S11: Calculation of Temperature Tci [K] of Insulation Gas in i-th Space of Cooler 42)

Figure 4:
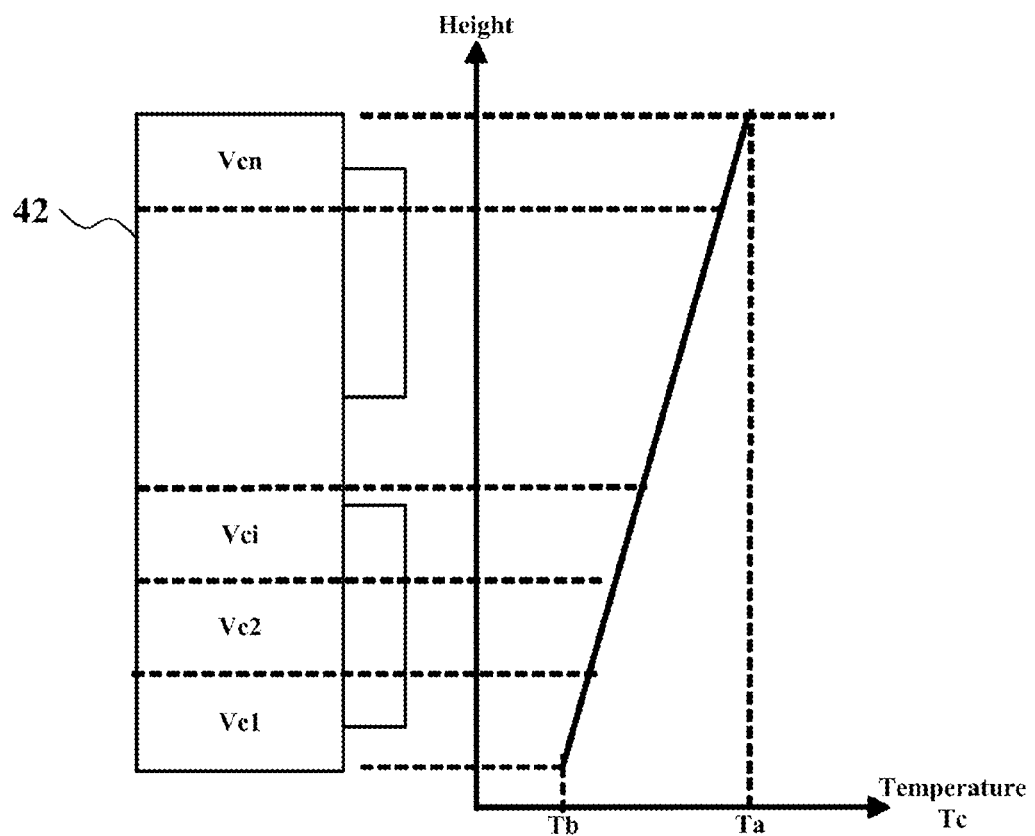
FIG. 4 is a diagram describing a calculation of a remaining amount of the insulation gas in a cooler of the gas leakage detection system according to the first embodiment.

As illustrated in FIG. 4, the temperature distribution in the cooler 42 is substantially linear. The calculator 35 equally divides the space in the cooler 42 into n spaces in parallel with the ground and sequentially calculates the temperature Tci [K] of the insulation gas 28 in the i-th space the cooler 42 where i=1 is met by Formula 5. The temperature Tc [K] is calculated for n of Tc1 to Tcn [K].

$$Tci=[Tb+i \cdot (Ta-Tb)Mb/n] \quad \text{(Formula 5)}$$

Ta [K] is the temperature of the insulation gas 28 in the divided space 21a detected by the temperature sensor 22a, and Tb [K] is the temperature of the insulation gas 28 in the divided space 21b detected by the temperature sensor 22b.

(Step S12: Calculation of Molar Weight Vci [l/mol] of Insulation Gas in i-th Space of Cooler 42)

The calculator 35 sequentially calculates the molar weight Vci [l/mol] of the insulation gas 28 in the i-th space in the cooler 42, which has been equally divided into n, where i=1 to n is met by Formula 6. The molar weight Vci [l/mol] is calculated for n of Vc1 to Vcn [l/mol].

$$Pg=[R \cdot Tc(Vc+B)-A]/Vc^2 \quad \text{(Formula 6)}$$

A and B are coefficients defined according to types of the insulation gas 28 contained in the container 27 and are primary functions for the molar weight Vc [l/mol] of the insulation gas 28. A and B are expressed by the formulae as same as the Formula 1A and 1B, respectively. The molar weight Vc [l/mol] corresponds to "a volume per a unit amount".

(Step S13: Calculation of Physical Quantity Mc [mol] of Insulation Gas 28 in Cooler 42)

Next, the calculator 35 calculates the physical quantity Mc [mol] of the insulation gas 28 in the cooler 42 by Formula 7.

$$Mc=[Uc/(n \cdot Vc1)]+[Uc/(n \cdot Vc1)]+[Uc/(n \cdot Vc2)] \ldots +[Uc/(n \cdot Vcn)] \quad \text{(Formula 7)}$$

Uc is a volume [l] of the cooler 42 and is set and stored in the storage 33 in advance. By the above scheme, the physical quantity Mc [mol] of the insulation gas 28 in the cooler 42 that is the amount of insulation gas 28 remaining in the cooler 42 is calculated.

In the above description, the calculator 35 sequentially calculates the temperature Tci [K] and the molar weight Vci [l/mol] of the insulation gas 28 in the i-th space in the cooler 42, which has been equally divided into n, where i=1 to n, and calculates the physical quantity Mc [mol] of the insulation gas 28 in the cooler 42. However, the temperature distribution in the cooler 42 is substantially linear. The calculator 35 may only calculate the temperature Tci [K] and the molar weight Vol [l/mol] of the insulation gas 28 in the predetermined i-th space in the cooler 42, which has been equally divided into n, and may calculate the physical quantity Mc [mol] of the insulation gas 28 in the cooler 42.

[Calculation of Physical Quantity Ml [mol] of Leaked Insulation Gas 28]

Figure 8:
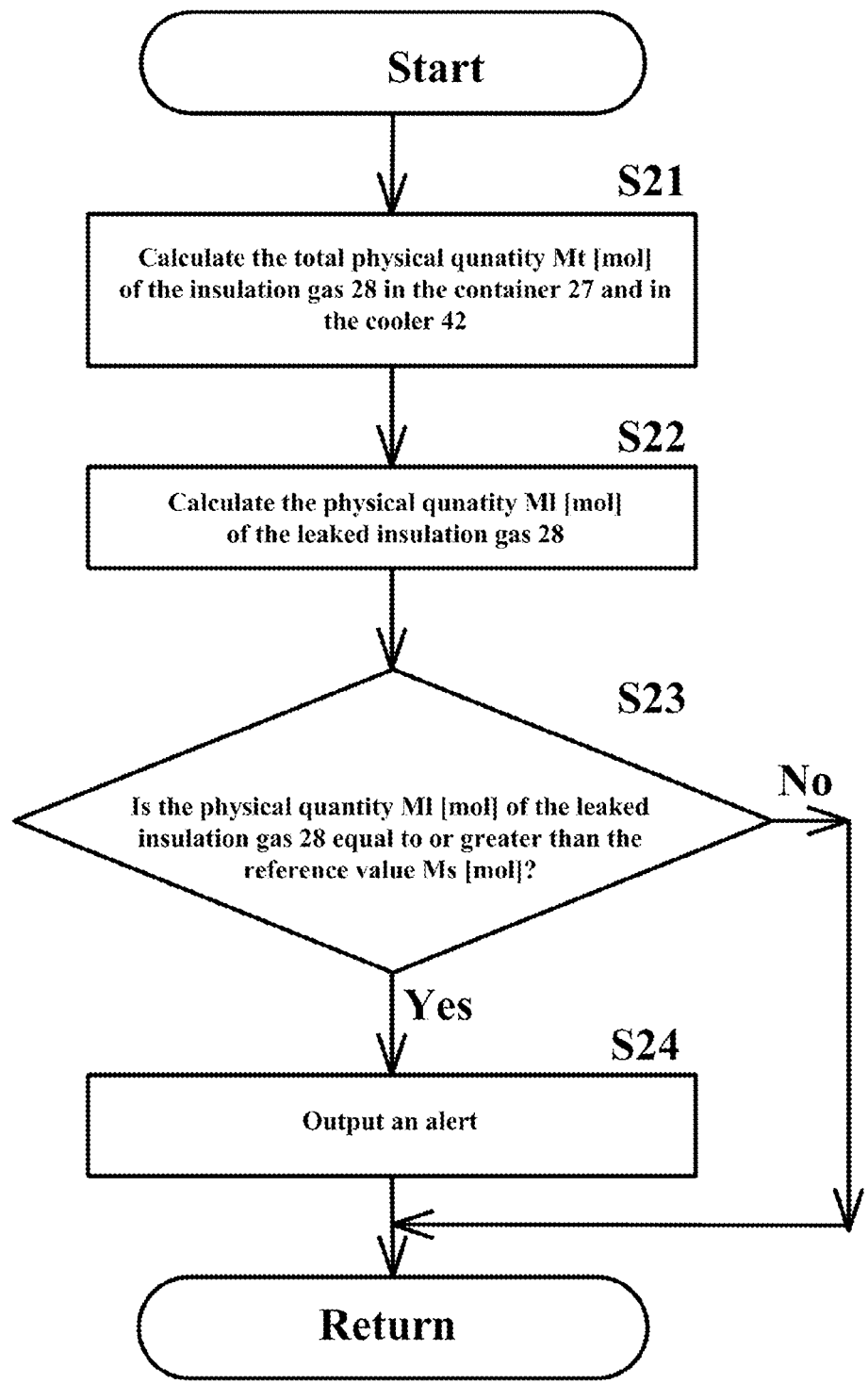
FIG. 8 is a program flow to calculate a physical quantity or the leaked insulation gas of the gas leakage detection system according to the first embodiment.

Next, the calculation scheme for the physical quantity Ml [mol] of the leaked insulation gas 28 is described. The monitor 3 outputs an alert when the physical quantity Ml becomes equal to or greater than the reference value Ms [mol] that is the predetermined upper limit for the leakage amount of the insulation gas 28. The calculator 35 calculates the physical quantity Ml [mol] and outputs an alert based on the program flow illustrated in FIG. 8. The program illustrated in FIG. 8 is periodically executed at constant intervals.

(Step S21: Calculation of Total Physical Quantity Mt [mol] of Insulation Gas 28 in Container 27 and Cooler 42)

The calculator 35 calculates the total physical quantity Mt [mol] that is a total amount of the insulation gas 28 in the container 27 and the cooler 42 by Formula 8.

$$Mt=mg+Mc \quad \text{(Formula 8)}$$

Mg is the physical quantity [mol] of the insulation gas 28 in the container 27, and Mc is the physical quantity [mol] of the insulation gas 28 in the cooler 42.

(Step S22: Calculation of Physical Quantity Ml [mol] of Leaked Insulation Gas 28)

Next, the calculator 35 calculates the physical quantity Ml [mol] of the leaked insulation gas 28 by Formula 9.

$$Ml=Mo-Mt \quad \text{(Formula 9)}$$

Mo is the physical quantity of the insulation gas 28 in the container 27 and the cooler 42 when there is no leakage and is set and stored in the storage 33 in advance. The calculated physical quantity Ml [mol] of the leaked insulation gas 28 is sequentially stored in the storage 33 and is output from the outputter 34 by displaying, printing, or communication telegram.

(Step S23: Determination of Whether Physical Quantity Ml [mol] of Leaked insulation Gas 28 is Equal To or Greater Than Reference Value Ms [mol])

Next, the calculator 35 determines whether the physical quantity Ml [mol] of the leaked insulation gas 28 is equal to or greater than the reference value Ms [mol] that is the predetermined upper limit for the leakage amount of the insulation gas 28 or not. The reference value Ms [mol] is stored in the storage 33 and is read out by the calculator 35.

When it is determined that the physical quantity Ml [mol] of the leaked insulation gas 28 is equal to or greater than the reference value Ms [mol] (YES in S23), the step proceed to Step S24. On the other hand, when it is determined that the physical quantity Ml [mol] of the leaked insulation gas 28 is not equal to or greater than the reference value Ms [mol] (NO in S23), the program is terminated.

(Step S24: Outputting Alert)

When it is determined that the physical Quantity Ml [mol] of the leaked insulation gas 28 is equal to or greater than the reference value Ms [mol], the calculator 35 controls the outputter 34 to output an alert indicating that the physical quantity Ml [mol] of the leaked insulation gas 28 is equal to or greater than the reference value Ms [mol]. The alert is output from the outputter 34 by displaying, printing, or communication telegram.

[Stopping Calculation of Physical Quantity Ml [mol] of Leaked Insulation Gas 28]

Next, a scheme of stopping the calculation of the physical quantity Ml [mol] of the leaked insulation gas 28 is described. When changes of the outside temperature detected by the air-temperature sensor 6 per a unit time exceeds the predetermined reference value, the monitor 3 stops the calculation of the physical quantity Ml [mol] of the leaked insulation gas 28.

Figure 5:
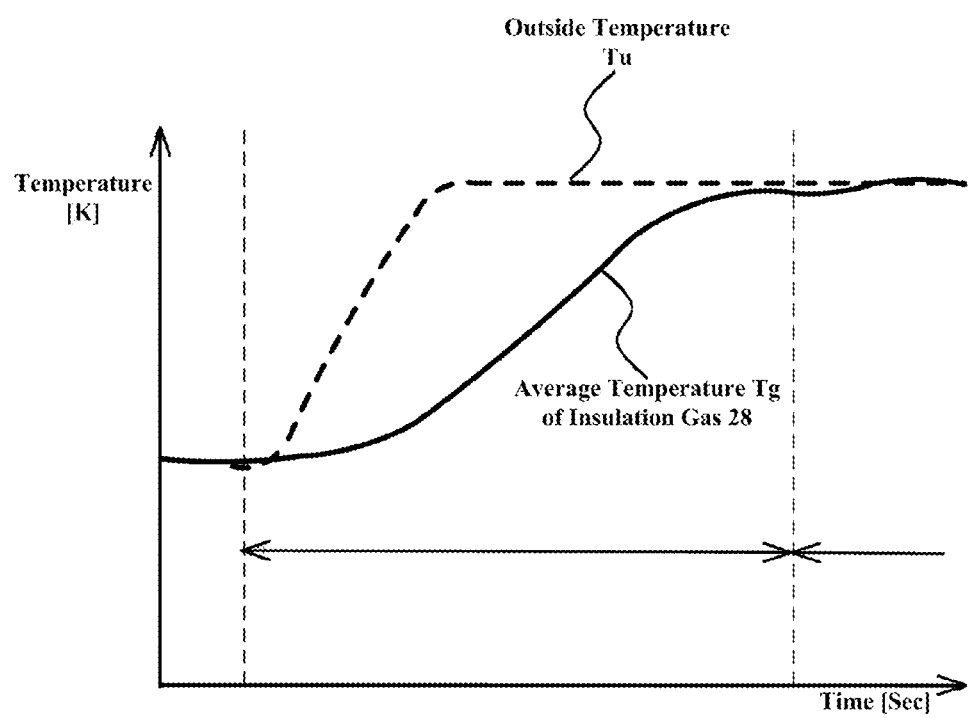
FIG. 5 is a diagram describing a detected temperature in the gas leakage detection system according to the first embodiment.

FIG. 5 illustrates an example of the average temperature Tg [K] of the insulation gas 28 in the container 27 and the outside temperature Tu [K] measured by the air-temperature sensor. When the load factor of the transformer 29 of the electrical apparatus 2 largely changes or when there is rainfall, there may be a difference between increases or decreases in the average temperature Tg [K] of the insulation gas 28 in the container 27 and the outside temperature Tu [K].

There may be the difference between the increases or the decreases in temperature when the average temperature Tg [K] of the insulation gas 28 in the container 27 and the outside temperature Tu [K] largely changes, or when heat generation condition or heat dissipation condition largely change and balance between the heat generation and the heat dissipation is lost. The average temperature Tg [K] of the insulation gas 28 in the container 27 slowly transiently changes.

When the physical quantity Mg [mol] of the insulation gas 28 in the container 27 is calculated while the average temperature Tg [K] of the insulation gas 28 in the container 27 is changing rapidly and transiently, the calculation accuracy largely decreased. As a result, the calculation accuracy of the physical quantity Ml [mol] of the leaked insulation gas 28 also largely decreases. To avoid these decreases in the calculation accuracy, when any of the outside temperature Tu [K] measured by the air-temperature sensor, the temperature Ta [K] of the insulation Gas 28 in the divided space 21a detected by the temperature sensor 22a, the temperature Tb [K] of the insulation gas 28 in the divided space 21b detected by the temperature sensor 22b, and the measurement value of CT for monitoring current (not illustrated) largely change, the calculation of the physical quantity Mg [mol] of the insulation gas 28 in the container 27 and the calculation of the physical quantity Ml [mol] of the leaked insulation gas 28 are stopped for certain times before and after such changes.

For example, when the outside temperature Tu [K] exceeds a limit value Ts [K] for the change in the outside temperature in a unit time, the calculator 35 determines to stop the calculation of the physical quantity Mg [mol] of the insulation gas 28 in the container 27 and the physical quantity Ml [mol] of the leaked insulation gas 28. After certain time elapses, the heat generation amount and the heat dissipation are balanced, and the temperature distribution of the insulation gas 28 in the container 27 returns to the normal state again, the calculator 35 restarts to calculate the physical quantity Mg [mol] of the insulation gas 28 in the container 27 and the physical quantity Ml [mol] of the leaked insulation gas 28. For example, when the outside temperature Tu [K] does not exceed the limit value Ts[K] for the change in the outside temperature in a unit time, the calculator 35 restarts to calculate the physical quantity Mg [mol] and the physical quantity Ml [mol].

Thus, the actions of the gas leakage detection system 1 is described.

[1-3. Effect]

(1) According to the present embodiment, since the gas leakage detection system 1 includes: the electrical apparatus 2 including: the container 27 to which the power distribution apparatus 29 is fixed and in which the insulation gas 28 is contained; the plurality of the divided spaces 21 in the container 28 divided in parallel with a ground; the plurality of the temperature sensors 22 which detects temperature of the insulation gas 28 and which is positioned in the plurality of the divided spaces 21; and the pressure sensor 23 which detects a pressure in the container 27; and the monitor 3 which calculates the remaining gas amount Mg [mol] of the insulation gas 28 remaining in the container 27 based on the temperature Ta [K] and Tb [K] of the insulation gas 28 detected by the plurality of the temperature sensors 22 and the pressure Pg [Pa] of the insulation gas 28 detected by the pressure sensor 23, the gas leakage detection system 1 with high detection accuracy for the remaining gas amount and the gas leakage amount of the insulation gas 28 in the container 27 forming the electrical apparatus 2.

Furthermore, small numbers of the temperature sensors 22 and the pressure sensors 23 are attached to the electrical apparatus 2, and unnecessary leakage of the insulation gas 28 leaking from attaching holes of the electrical apparatus 2 to which the temperature sensors 22 and the pressure sensors 23 can be suppressed.

(2) According to the present embodiment, by calculating the remaining gas amount Ma [mol] and Mb [mol] of the insulation gas 28 in the divided spaces 21 based on the temperature Ta [K] and Tb [K] detected by the plurality of the temperature sensors 22 and the pressure Pg [Pa] detected by the pressure sensors 23, and adding the calculated remaining gas amount Ma [mol] and Mb [mol] of the insulation gas 28 in the divided spaces 21, the remaining Gas amount Mg [mol] of the insulation gas 28 remaining in the container 27 forming the electrical apparatus 2, the gas leakage detection system 1 can detect the remaining gas amount and the gas leakage amount of the insulation gas 28 in the container 27 forming the electrical apparatus with more accuracy.

In the conventional technology, a gas leakage detection system which detects the gas leakage amount based on the change over time of the pressure of the insulation gas calculated by the temperature correction, a gas leakage detection system with improved detection accuracy of the gas leakage amount which corrects the gas leakage amount based on the measured current value, a gas leakage detection system with improved detection accuracy of the gas leakage amount which learns correlation between the flowing current, the temperature of the insulation gas, and the gas temperature distribution in the system in advance, acquires the gas temperature distribution in the system from the flowing current and the surface temperature of the apparatus, and corrects the temperature, are known.

However, if the electrical apparatus 2 is configured by, for example, gas insulation stationary induction electrical apparatuses including therein heating elements which are formed by windings and which generate large amount of heat, and if the insulation gas 28 is cooled by natural circulation by heat dissipation using cooling apparatuses such as the cooler 42 or by forced circulation using circulation apparatuses such as the gas blower 41, in the conventional gas leakage detection system, the complicated temperature distribution occurs in the container 27 and the temperature distribution constantly changes, such that the detection accuracy for the gas leakage amount is reduced.

To suppress the effect by the change in the temperature distribution in the container 27, a large number of the temperature sensors, the pressure sensors, and the density sensors may be provided in the container 27 However, providing a large number of sensors in the container 27 leads to the higher cost of the gas leakage detection system 1 and is not desirable. From the viewpoint of countermeasures for the global warming effect and unexpected apparatus failure, it is desirable that the gas leakage detection system 1 has the detection accuracy of the gas leakage amount of 0.5%/year.

According to the present embodiment, by providing a small number of the temperature sensors 22 and the pressure sensors 23 in the container 27, the gas leakage detection system 1 with high detection accuracy, for the remaining gas amount and the gas leakage amount of the insulation gas 28 in the container 27.

According to the present embodiment, since the remaining gas amount of the plurality of the divided spaces 21 are calculated based on the temperature and the pressure of the plurality of the divided spaces in the container 27, and the gas leakage amount is calculated based on the calculated remaining gas amount, the gas leakage detection system 1 can detect the remaining gas amount and the gas leakage amount of the insulation gas 28 with high accuracy.

(3) According to she present embodiment, since the plurality of the divided spaces 21 is formed by dividing the container 27 using the partition plate 24 provided in parallel with the ground, the temperature in the plurality of the divided spaces is more uniform than when the container is not divided by the partition plate 24. Since the remaining gas amount is calculated for each of the plurality of the divided spaces, the gas leakage detection system 1 can detect the remaining gas amount and the gas leakage amount of the insulation gas 28 with high accuracy.

(4) According to the present embodiment, the container 27 is connected to the circulator 4 to circulate the insulation gas 28. The circulator 4 includes the gas blower 42, and when the circulator 4 forcibly circulates the insulation gas 28, the internal temperature of the plurality of the divided spaces 21 becomes more uniform. Since the remaining as amount is calculated for each of the plurality of the divided spaces, the gas leakage detection system 1 can detect the remaining gas amount and the gas leakage amount of the insulation gas 28 with high accuracy.

(5) According to the present embodiment, the circulator 4 includes the cooler 42, and since the total remaining gas amount is calculated by adding the remaining gas amount of the insulation gas 28 remaining in the container 27 and the remaining gas amount of the insulation gas 28 remaining in the cooler 42, the remaining gas amount and the gas leakage amount of the insulation gas 28 can be detected with high accuracy. Since the total remaining gas amount is calculated by adding the remaining gas amount of the insulation gas 28 remaining in the cooler 42, the remaining gas amount and the gas leakage amount including the remaining gas amount in the cooler 42 and the gas leakage amount leaked from the cooler 42 are calculated, so that the gas leakage detection system 1 can detect the remaining gas amount and the gas leakage amount of the insulation gas 28 with high accuracy.

(6) According to the present embodiment, since the remaining gas amount Mc [mol] of the insulation gas 28 remaining in the cooler 42 is calculate based on the temperature Tc [K] calculated for each of the divided spaces in the cooler 42 and the molar weight Vc [l/mol] that is the volume of the insulation gas 28 per a unit amount, the remaining gas amount and the gas leakage amount of the insulation gas 28 are detected more accurately.

(7) According to the present embodiment, the monitor 3 calculates the gas leakage amount of the insulation gas 28 based on the calculated remaining gas amount of the insulation gas remaining in the container 27, and since the outputter 34 outputs an alert when the gas leakage amount becomes equal to or greater than the predetermined reference value, the workers can recognize that the gas leakage amount of the insulation gas 28 if the electrical apparatus 2 became equal to or greater than the predetermined reference value before the electrical apparatus 2 fails.

If the gas leakage amount becomes equal to or greater than the predetermined reference value and if the system does not include the outputter 34 to output an alert, an alert to report the failure of the electrical apparatus 2 is suddenly made, and it is required to immediately stop the operation of the electrical apparatus 2. Unexpected stopping of the electrical apparatus is not desirable.

According to the present embodiment, since the outputer 34 output an alert when the gas leakage amount becomes equal to or greater than the predetermined reference value, slight gas leakage such as by the deterioration of sealing materials of the container 27 is reported to the workers beforehand, and the worker can preventively replace the components, and the unexpected stopping of the electrical apparatus 2 can be prevented.

(7) According to the present embodiment, the gas leakage detection system 1 includes the air-temperature sensor 6, and since the monitor 3 stops the calculation of the gas leakage amount of the insulation gas 28 when the change in the outside temperature detected by the air-temperature sensor 6 per a unit time exceeds the predetermined reference value, the calculation of the remaining gas amount and the gas leakage amount can be stopped while the remaining gas amount and the gas leakage amount of the insulation gas 28 cannot be detected with high accuracy. By this, the gas leakage detection system 1 can detect the remaining gas amount and the gas leakage amount of the insulation gas 28 with high accuracy.

When the load of the stationary induction electrical apparatus forming the electrical apparatus 2 largely changes or when the outside temperature Tu largely changes by, for example, rainfall, the heat generation condition or the heat dissipation condition largely change, the balance between the heat generation and the heat dissipation is lost, and the gas temperature distribution in the container 27 transiently changes. At this time, the detection accuracy for the remaining gas amount and the gas leakage amount of the insulation gas 28 greatly decreases.

According to the present embodiment, since the calculation of the gas leakage amount of the insulation gas 28 is stopped when the change in the outside temperature Tu detected by the air-temperature sensor 6 per a unit time exceeds the predetermined reference value, the decrease in the detection accuracy for the remaining gas amount and the gas leakage amount of the insulation gas 28 due to the rapid change in the load of the electrical apparatus 2 and the outside temperature Tu can be prevented.

2. Second Embodiment

[2-1. Configuration and Effect]

Figure 9:
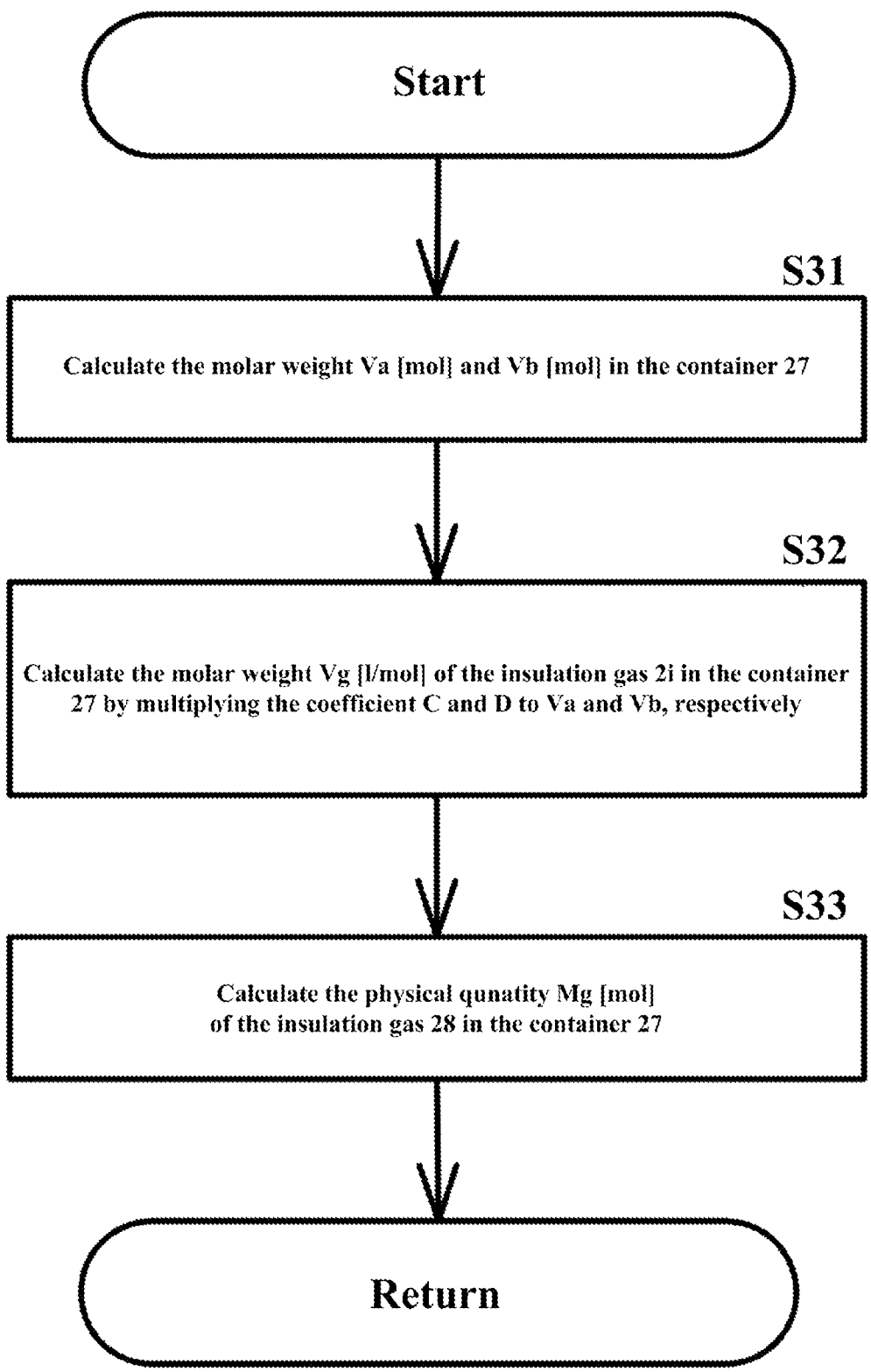
FIG. 9 is a program flow to calculate a physical quantity of the insulation gas in the container of the gas leakage detection system according to a second embodiment.

The gas leakage detection system 1 of the first embodiment is characteristic in that the physical quantity Mg [mol] of the insulation gas 28 in the container 27 is calculated based on the program flow illustrated in FIG. 6. A gas leakage detection system 1 of a second embodiment is characteristic in that the physical quantity Mg [mol] of the insulation gas 28 in the container 27 is calculated based on a program flow illustrated in FIG. 9. Other configuration thereof are the same as the first embodiment. The calculation scheme for the physical quantity Mg [mol] of the insulation gas 28 in the container 27 in the gas leakage detection system 1 of the present embodiment is described based on the program flow illustrated in FIG. 9. The physical quantity Mg [mol] of the insulation gas 28 in the container 27 is calculated by the following scheme.

[Calculation of Physical Quantity Mg [mol] of Insulation Gas 28 in Container 27]

(Step S31: Calculation of Molar Weight Va [l/mol] and Molar Weight Vb [l/mol] of Insulation Gas 28 in Regions in Container 27 Divided into Two by Partition Plate 24)

The calculator 35 calculates the molar weight Va [l/mol] in the divided space 21a and the molar weight Vb [l/mol] in the divided space 21b by Formulae 10 and 11.

$$Pg=[R \cdot Ta(Va+B)-A]/Va^2 \qquad \text{(Formula 10)}$$

$$Pg=[R \cdot Tb(Va+B)-A]/Vb^2 \qquad \text{(Formula 11)}$$

Ta [K] is the temperature of the insulation gas 28 in the divided space 21a detected by the temperature sensor 22a, and Tb [K] is the temperature of the insulation gas 28 in the divided space 21b detected by the temperature sensor 22b. A and B are coefficients defined according to A and B in Formula 1 and types of the insulation gas 28 contained in the container 27, are primary functions for the molar weight Va [l/mol] of the insulation gas 26, and are the same as A and B in Formula 1.

(Step S32: Calculation of Molar Weight Vg [l/mol] of Insulation Gas 28 in Container 27)

The calculator 35 calculates the molar weight Vg [l/mol] of the insulation gas 28 in the container 27 by Formula 12.

$$Vg=(C \cdot Va+D \cdot Vb)/2 \qquad \text{(Formula 12)}$$

C and D are constants unique for the apparatus forming the electrical apparatus 2. C and D are weighting factors related to the volume and are absolute numbers. C and D have "1" as the median, and when the median exceeds "1", the contribution rate to the average temperature is high and when the median is less than "1", the contribution rate to the average temperature is low. C and D are values that meet C+D=2. For example, C and D may be values that meet C−=1.1, D=0.9.

C and D are unique values for each of the electrical apparatuses 2. C and D are defined based on actual values of temperature and pressure measured in an environment where there is theoretically no leakage of the insulation gas 28, such as in temperature rise test performed before delivering the electrical apparatus 2, and molar weight calculated therefrom. C and D are input from the operator 32 by the worker and are set and stored in the storage 33. In the above description, although C and D has the median of "1", C and D may have any values as the median, and Formula 12 may be in accordance with C and D having any median.

(Step S33: Calculation of Physical Quantity Mg [mol] of insulation Gas 28 in Container 27)

Next, the calculator 35 calculates the physical quantity Mg [mol] of the insulation gas 28 in the container 27 by Formula 13.

$$Mg=Ug/Vg \qquad \text{(Formula 13)}$$

Ug is a volume [l] of the container 27 and is set and stored in the storage 33 in advance.

The action of the gas leakage detection system 1 of the present embodiment is described above.

[2-2. Effect]

(1) According to the present embodiment, since the gas leakage detection system 1 includes: the electrical apparatus 2 including: the container 27 to which the power distribution apparatus 29 is fixed and in which the insulation gas 28 is contained; the plurality of the divided spaces 21 in the container 27 divided in parallel with a ground; the plurality of the temperature sensors 22 which detects temperature of the insulation gas 28 and which is positioned in the plurality of the divided spaces 21; and the pressure sensor 23 which detects a pressure in the container 27; and the monitor 3 which calculates the remaining gas amount Mg [mol] of the insulation gas 28 remaining in the container 27 based on the temperature Ta [K] and Tb [K] of the insulation gas 28 detected by the plurality of the temperature sensors 22 and the pressure Pg [Pa] of the insulation gas 28 detected by the pressure sensor 23, the gas leakage detection system 1 with high detection accuracy for the remaining gas amount and the gas leakage amount of the insulation gas 28 in the container 27 forming the electrical apparatus 2.

Furthermore, small numbers of the temperature sensors 22 and the pressure sensors 23 are attached to the electrical apparatus 2, and unnecessary leakage of the insulation gas 28 leaking from of the electrical apparatus 2 to which the temperature sensors 22 and the pressure sensors 23 can be suppressed.

(2) According to the present embodiment, by calculating the remaining gas amount Mg [mol] of the insulation gas 28 remaining in the container 27 based on the average temperature Tg [K] which is calculated by multiplying the predetermined weighting factors C and D to respective temperature Ta [K] and Tb [K] detected by the plurality of the temperature sensors 22, and the pressure Pg [Pa] detected by the pressure sensors 22, the gas leakage detection system 1 can detect the remaining gas amount and the gas leakage amount of the insulation gas 28 in the container 27 forming the electrical apparatus 2 with more accuracy.

3. Other Embodiments

Although embodiments including modifications thereof are described, these embodiments are merely provided as examples and are not intended to limit the scope of claims. These embodiments may be implemented by other various forms, and various omissions, replacements, and modifications may be performed to the embodiments without departing from the abstract of the invention. These embodiments and modifications thereof are included in the scope and abstract of the invention, as well as the invention described in the scope of claims and equivalent ranges thereto.

In the above embodiment, although the electrical apparatus 2 is formed by the transformer 29, it is not limited thereto. The electrical apparatus 2 may be formed by other electrical apparatuses such as reactors and switches.

In the above embodiment, although the electrical apparatus 2 includes the partition plate 24, the electrical apparatus 2 may not include the partition plate 24. Furthermore, in the above embodiment, although the electrical apparatus 2 includes one partition plate 24 and two divided spaces 21a and 21b are formed by the partition plate 24, the electrical, apparatus may include a plurality of partition plates 24. The electrical apparatus 2 may be divided into three or more divided spaces 21. The temperature sensors 22 may be arranged in each of three or more divided spaces 21, the physical quantity of the insulation gas 28 may be calculated for each of the divided spaces 21, and the physical quantity Mg of the insulation gas 28 in the container 27 and the physical quantity Ml of the leaked insulation gas may be calculated.

In the above embodiment, although the temperature sensor 22a is arranged on the inner wall of the container 28 forming the divide space 21a and the temperature sensor 22b is arranged on the inner wall of the container 28 forming the divide space 21b, the temperature sensor 22a may be arranged in the piping 5a and the temperature sensor 22b may be arranged in the piping 5b.

In the above embodiment, although the circulator 4 includes the gas blower 4a, the circulator 4 may not include the gas blower 41 and may naturally circulate the insulation gas 28 by the heat generation of the transformer 29. In addition, in the above embodiment, although the electrical apparatus 2 includes the circulator 4, the electrical apparatus 2 may not include the circulator 4.

The gas leakage detection system 1 may include sensors such as CTs to detect the flowing current of the electrical apparatus 2. The flowing current of the electrical apparatus 2 detected by the sensors such as CTs is transmitted to the monitor 3 or a computer for power management (not illustrated).

REFERENCE SIGN

1: gas leakage detection system.
2: electrical apparatus
3: monitor
4: circulator
5, 5a, 5b: piping
6: air-temperature sensor
21, 21a, 21b: divided space
22, 22a, 22b: temperature sensor
23: pressure sensor
24: partition plate
27: container
28: insulation gas
29: transformer
31: inputter
32: operator
33: storage
34: outputter
35: calculator
41: gas blower
42: cooler
43: piping
61: sunshade
291: iron core
292: winding

The invention claimed is:

1. A gas leakage detection system comprising:
an electrical apparatus comprising:
a container to which a power distribution apparatus is fixed and in which an insulation gas is contained;
a plurality of divided spaces in the container divided in parallel with a ground;
a plurality of temperature sensors which detects temperature of the insulation gas and which is positioned in the plurality of the divided spaces; and
a pressure sensor which detects a pressure in the container; and
a monitor which calculates a remaining gas amount of the insulation gas remaining in the container based on the temperature of the insulation gas detected by the plurality of the temperature sensors and the pressure of the insulation gas detected by the pressure sensor,
wherein
the container is connected to a circulator to circulate the insulation gas,
the circulator includes a cooler, and
the monitor calculates a total remaining gas amount by adding the remaining gas amount of the insulation gas remaining in the container and a remaining gas amount of the insulation gas remaining in the cooler.

2. The gas leakage detection system according to claim 1, wherein the monitor calculates the remaining gas amount of the insulation gas remaining in the container by calculating the remaining gas amount of the insulation gas for each of the divided spaces based on the temperature of the insulation gas detected by the plurality of the temperature sensors and the pressure of the insulation gas detected by the pressure sensor, and adding the calculated remaining gas amount of the insulation gas for each of the divided spaces.

3. The gas leakage detection system according to claim 1, wherein the monitor calculates the remaining gas amount of the insulation gas remaining in the container based on an average molar volume calculated by multiplying a predetermined weighting factor to the temperature of the insulation gas detected by the plurality of the temperature sensors and the pressure of the insulation gas detected by the pressure sensor.

4. The gas leakage detection system according to claim 1, wherein the plurality of the divided spaces is divided and formed by a partition plate provided in the container in parallel with the ground.

5. The gas leakage detection system according to claim 1, wherein the monitor divides a space in the cooler into a plurality of n spaces, and the remaining gas amount of the insulation gas remaining in the cooler is calculated based on temperature calculated for each of the n spaces in the cooler and a volume of the insulation gas per a unit amount.

6. The gas leakage detection system according to claim 1, wherein the monitor calculates a gas leakage amount of the insulation gas based on the remaining gas amount of the insulation gas remaining in the container, and outputs an alert to an outputted when the gas leakage amount becomes equal to or more than a reference value.

7. The gas leakage detection system according to claim 6, further comprising an air-temperature sensor detecting an outside temperature,
wherein the monitor stops calculating the gas leakage amount of the insulation gas when a change of the outside temperature detected by the air-temperature sensor per a unit time exceeds a predetermined reference value.

8. A gas leakage detection method for an electrical apparatus comprising a container to which a power distribution apparatus is fixed and in which an insulation gas is contained, a plurality of divided spaces in the container divided in parallel with a ground, a plurality of temperature sensors which detects temperature of the insulation gas and which is positioned in the plurality of the divided spaces, and a pressure sensor which detects a pressure in the container,
the gas leakage detection method comprising: calculating the remaining gas amount of the insulation gas remaining in the container by calculating the remaining gas amount of the insulation gas for each of the divided spaces based on the temperature of the insulation gas detected by the plurality of the temperature sensors and the pressure of the insulation gas detected by the pressure sensor, and adding the calculated remaining gas amount of the insulation gas for each of the divided spaces,
wherein
the container is connected to a circulator to circulate the insulation gas,
the circulator includes a cooler, and
the monitor calculates a total remaining gas amount by adding the remaining gas amount of the insulation gas remaining in the container and a remaining gas amount of the insulation gas remaining in the cooler.

9. A gas leakage detection method for an electrical apparatus comprising a container to which a power distribution apparatus is fixed and in which an insulation gas is contained, a plurality of divided spaces in the container divided in parallel with a ground, a plurality of temperature sensors which detects temperature of the insulation gas and which is positioned in the plurality of the divided spaces, and a pressure sensor which detects a pressure in the container,
the gas leakage detection method comprising: calculating the remaining gas amount of the insulation gas remaining in the container based on an average molar volume calculated by multiplying a predetermined weighting factor to the temperature of the insulation gas detected by the plurality of the temperature sensors and the pressure of the insulation gas detected by the pressure sensor,
wherein
the container is connected to a circulator to circulate the insulation gas,
the circulator includes a cooler, and
the monitor calculates a total remaining gas amount by adding the remaining gas amount of the insulation gas remaining in the container and a remaining gas amount of the insulation gas remaining in the cooler.

* * * * *